United States Patent [19]

Crawford et al.

[11] Patent Number: 4,868,748

[45] Date of Patent: Sep. 19, 1989

[54] RAPID PROCESSING OF THREE-DIMENSIONAL GRAPHICAL OBJECTS FROM TOMOGRAPHIC DATA

[75] Inventors: Carl R. Crawford, Milwaukee, Wis.; David M. Frazee, Knoxville, Tenn.; Enrique Santos, Lowell, Mass.

[73] Assignee: General Electric Company, Milwaukee, Wis.

[21] Appl. No.: 125,426

[22] Filed: Nov. 25, 1987

[51] Int. Cl.⁴ .............................................. G06F 15/42
[52] U.S. Cl. ............................... 364/413.22; 364/518; 364/521
[58] Field of Search ...................... 364/413.22, 413.13, 364/413.18, 521, 518; 382/6, 27; 340/747

[56] References Cited

U.S. PATENT DOCUMENTS

| | | | |
|---|---|---|---|
| 4,710,876 | 12/1987 | Cline et al. | 364/413.22 |
| 4,719,585 | 1/1988 | Cline et al. | 364/521 |
| 4,751,643 | 6/1988 | Lorensen et al. | 382/6 |

Primary Examiner—Jerry Smith
Assistant Examiner—Kimthanh T. Tbui
Attorney, Agent, or Firm—Douglas E. Stoner; James O. Skarsten

[57] ABSTRACT

Three-dimensional objects within a tomographic database are extracted for viewing by comparing the tomographic data to a predetermined threshold or range defining the object boundaries. A surface extraction method is structured so as to allow for several vector operations, thus adapting the method for implementation using an array processor.

10 Claims, 5 Drawing Sheets

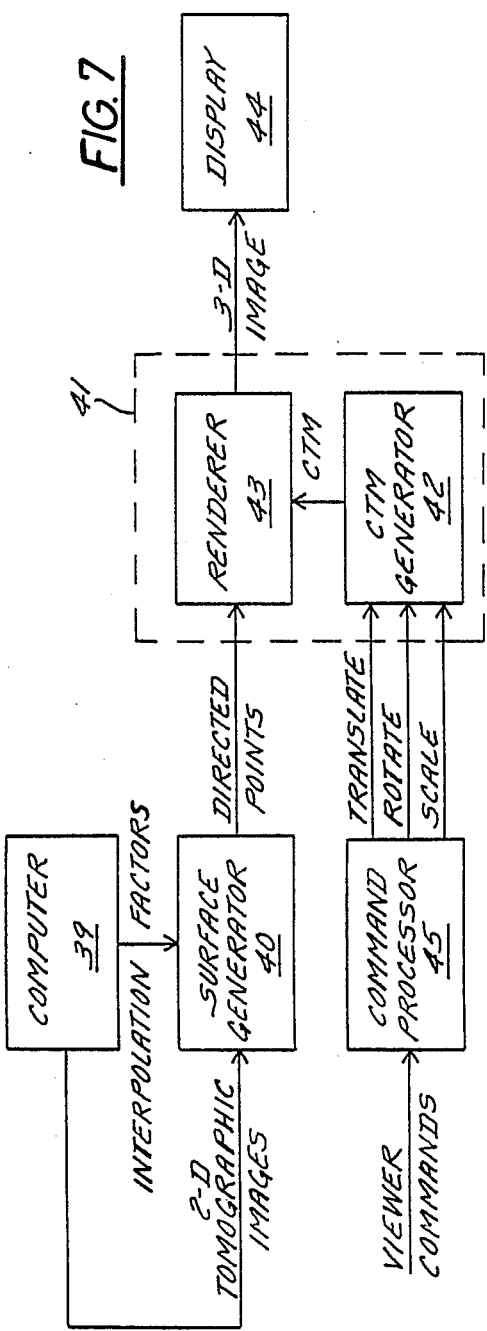
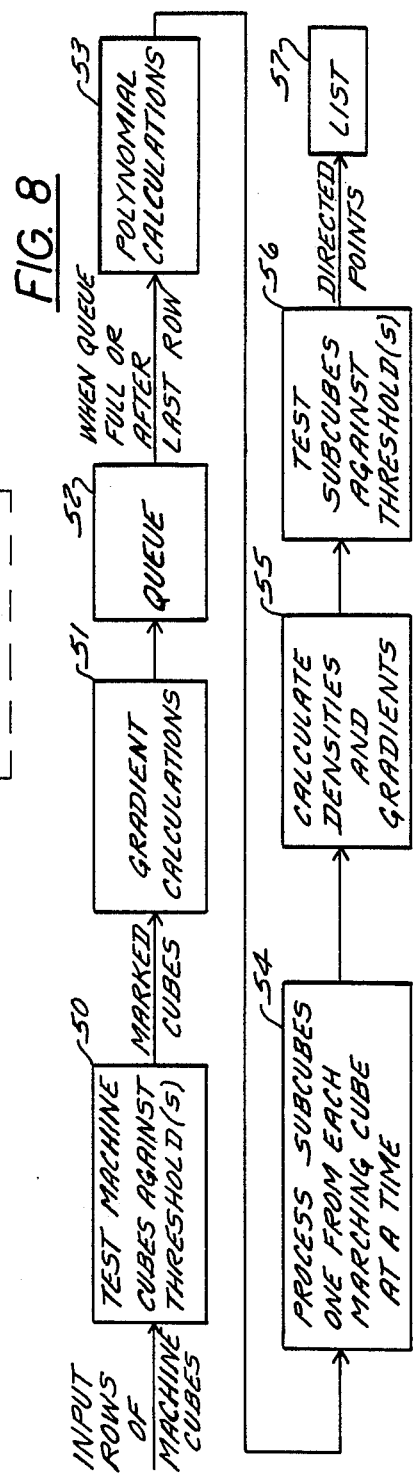
FIG. 7
FIG. 8

RAPID PROCESSING OF THREE-DIMENSIONAL GRAPHICAL OBJECTS FROM TOMOGRAPHIC DATA

The present application is related to U.S. Ser. No. (07-125662) and to U.S. Ser. No. (07-125510), filed of even date.

BACKGROUND OF THE INVENTION

The present invention relates in general to three-dimensional (3-D) display of tomographic data, and more specifically to increasing processing speed by adopting array processing techniques, as in an array processor which is optimized for vector operations.

Tomographic medical imaging employs the collection of data representing cross sections of a body. A plurality of object interrogations can be processed mathematically to produce representations of contiguous cross-sectional images. Such cross-sectional images are of great value to the medical diagnostician in a non-invasive investigation of internal body structure. The technique employed to collect the data is a matter of indifference to the present invention. Any technique such as, for example, X-ray computed tomography, nuclear magnetic resonance tomography, single-photon emission tomography, positron emission tomography, or ultrasound tomography may serve equally.

A body to be imaged exists in three dimensions. Tomographic devices process data for presentation as a series of contiguous cross-sectional slices along selectable axes through the body. Each cross-sectional slice is made up of a number of rows and columns of voxels (parallelepiped volumes with certain faces corresponding to pixel spacing within each slice and others corresponding to slice spacing), each represented by a digitally stored number related to a computed signal intensity in the voxel. In practice, an array of, for example, 64 slices may each contain 512 by 512 voxels. In normal use, a diagnostician reviews images of a number of individual slices to derive the desired information. In cases where information about a surface within the body is desired, the diagnostician relies on inferences of the 3-D nature of the object derived from interrogating the cross-sectional slices. At times, it is difficult or impossible to attain the required inference from reviewing contiguous slices. In such cases, a synthesized 3-D image would be valuable.

Synthesizing a 3-D image from tomographic data is a two-step process. In the first step, a mathematical description of the desired object is extracted from the tomographic data. In the second step, the image is synthesized from the mathematical description.

Dealing with the second step first, assuming that a surface description can be synthesized from knowledge of the slices, the key is to go from the surface to the 3-D image. The mathematical description of the object is made up of the union of a large number of surface elements (SURFELS). The SURFELS are operated on by conventional computer graphics software, having its genesis in computer-aided design and computer-aided manufacturing, to apply surface shading to objects to aid in image interpretation through a synthesized two-dimensional image. The computer graphics software projects the SURFELS onto a rasterized image and determines which pixels of the rasterized image are turned on, and with what intensity or color. Generally, the shading is lightest (i.e., most intense) for image elements having surface normals along an operator-selected line of sight and successively darker for those elements inclined to the line of sight. Image elements having surface normals inclined more than 90 degrees from the selected line of sight are hidden in a 3-D object and are suppressed from the display. Foreground objects on the line of sight hide background objects. The shading gives a realistic illusion of three dimensions.

Returning now to the problem of extracting a mathematical description of the desired surface from the tomographic slice data, this step is broken down into two subtasks, namely the extraction of the object from the tomographic data, and the fitting of the surface to the extracted object. A number of ways are available to do the first subtask. For example, it is possible to search through the signal intensities in the voxels of a slice to discern regions where the material forming the object has sufficient signal contrast with surrounding regions. For example, signal intensities characteristic of bone in X-ray computed tomography have high contrast with surrounding tissue. A threshold may then be applied to the voxels to identify each one in the complete array lying in the desired object from all voxels not in the object.

Referring now to the second subtask, one techinue for fitting the 3-D surface to the extracted object is known as the dividing cubes method which is disclosed in commonly assigned U.S. patent application Ser. No. 770,164, fled Aug. 28, 1985, which is hereby incorporated by reference. By the dividing cubes method, the surface of interest is represented by the union of a large number of directed points. The directed points are obtained by considering in turn each set of eight cubically adjacent voxels in the data base of contiguous slices. Gradient values are calculated for the cube vertices using difference equations. If the surface passes through a large cube, then it is subdivided to form a number of smaller cubes, referred to as subcubes or subvoxels. By interpolation of the adjacent point densities and gradient values, densities are calculated for the subcube vertices and a gradient is calculated for the center of the subcube. The densities are tested (e.g., compared to a threshold). If some are greater and some less than the threshold, then the surface passes through the subcube. In that case, the location of the subcube is output with its normalized gradient, as a directed point. It is also possible to efine a surface using a range of densities (e.g., an upper and a lower threshold). The union of all directed points generated by testing all subcubes within large cubes through which the surface passes, provides the surface representation. The directed points are then rendered (i.e., rasterized) for display on a CRT, for example.

The dividing cubes method as previously described and implemented is tailored to run on a serial computer. However, most tomographic medical diagnostic imaging systems include an array processor which is typically used to reconstruct two-dimensional slice images from scan data. Array processors employ vector processing in operating on arrays of data. Since an array processor is typically available and since its use can potentially speed up image processing, it would be desirable to implement the dividing cubes method using the array processor associated with diagnostic imaging equipment to render 3-D images.

An array processor is designed to perform various operations (referred to as a vector routine) on a plurality of data elements (i.e., a vector) supplied by a host computer and sometimes to also perform other tasks such as memory access simultaneously with those operations, as opposed to a serial computer wherein all actions are consecutive. Thus, the operation and programming of an array processor are significantly different from those of a serial computer. Furthermore, there is a certain amount of overhead involved in involking a vector routine in order to set up the data and parameters. Unless the array to be processed by a vector routine is sufficiently large, the run time will be degraded by the overhead.

When an array processor is programmed to perform the dividing cubes method according to the steps previously defined, the surface generating time for an image is extremely long, much longer than on a serial computer. The long run time results from the incompatibility between the serial strategy inherent in the dividing cubes method and the vector nature of array processors and from the large proportion of overhead to the number of elements available for each call to a vector routine.

Accordingly, it is a principal object of the present invention to provide a method and apparatus for rapid processing of three-dimensional graphical data.

It is another object of the invention to provide a modified dividing cubes method for extracting surface definitions from tomographic data adapted to be executed using vector processing.

It is yet another object of the invention to reduce the effect of overhead in performing 3-D image surface generation on an array processor.

SUMMARY OF THE INVENTION

These and other objects of the invention are achieved by modifying the dividing cubes method so as to simultaneously process a plurality of elements along one of the dimensional axes (e.g., row) in a tomographic data base. In a preferred embodiment, a plurality of large cubes are processed simultaneously and those through which the surface passes are sent to a queue.

The cubes from the queue are subdivided when the queue contains a sufficient number of elements to justify the overhead required for the vector routines performing subdivision. In one embodiment, the tri-linear interpolation used to generate subcube density and gradient values is performed using a polynomial interpolation so that all the values for one subcube can be found independently of the other subcubes in the same large cube. A further improvement in speed and memory utilization is achieved by using a series approximation in evaulating the polynomial.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings in which:

FIG. 7 is a block diagram of processing hardware in one embodiment of the invention.

FIG. 8 is a block diagram according to a preferred array processor embodiment of the invention.

DETAILED DESCRIPTION OF THE INVENTION

Figure 1:
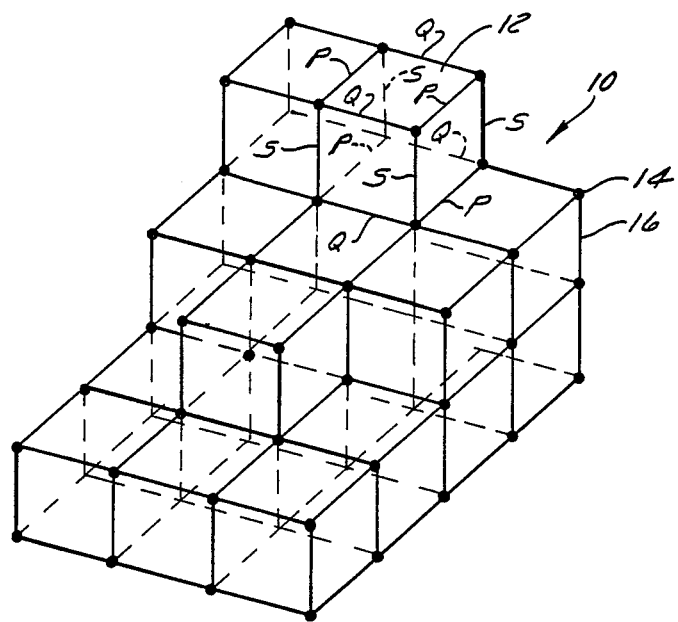
FIG. 1 represents a portion of an array of tomographic data from which a surface is to be extracted.

Referring to FIG. 1, there is shown, generally at 10, a part of a tomographic array including an array of cubes 12 defined by nodes 14 connected by edges 16. Each node 14 represents a signal amplitude of a voxel of tomographic data and each edge 16 represents the distance from one voxel to its neighbor. Although the volumes described are referred to as cubes, edges 16 are not necessarily all of equal length and are probably not since slice thickness is usually not equal to pixel resolution within the slice. Pixel spacings P and Q and slice spacing S are shown for cube 12.

Figure 2:
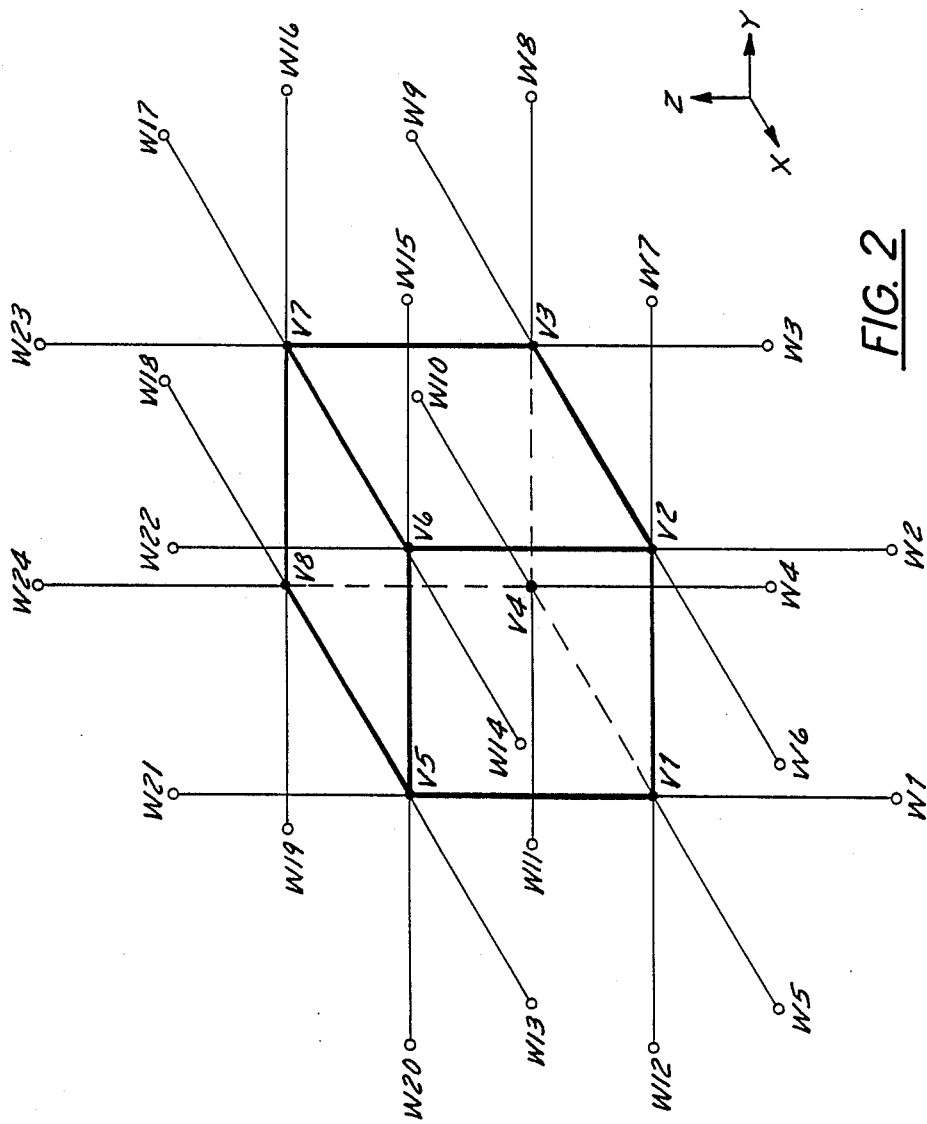
FIG. 2 is a perspective view showing a large cube and its adjacent data points.

In the practice of the invention, each large cube containing the surface to be displayed (as determined by comparisons with a threshold) is subdivided by integer factors (greater than or equal to zero) into a number of subcubes. The vertices of the subcubes are compared to the threshold (or thresholds) to identify subcubes through which the surface passes. For such identified subcubes, the subcube location and normalized gradient for the subcube center are concatenated resulting in a directed point. The process of subdivision uses a large cube and adjacent points as shown in FIG. 2. Cubically adjacent voxels from the tomographic data are selected to represent the vertices V1-V8 of the large cube. Points W1-W24 are adjacent to V1-V8 and are used in conjunction with V1-V8 to calculate the gradients at the vertices of the large cube. Interpolation can then be performed on the cube and the gradients.

Figure 3:
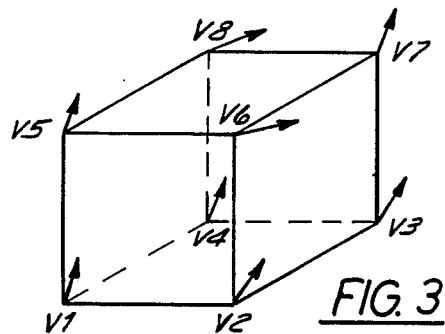
FIG. 3 shows the gradient normals associated with each cube vertex.
Figure 4:
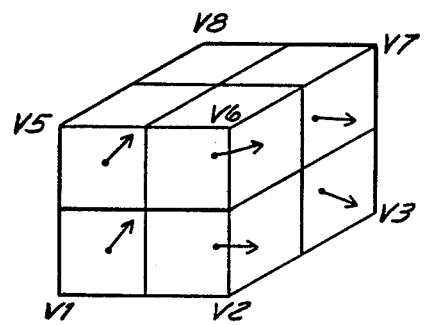
FIG. 4 shows subcubes and their gradient normals.
Figure 5:
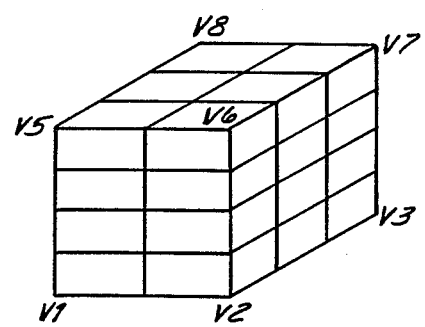
FIG. 5 shows subdivision using a different amount of interpolation than FIG. 4.

FIG. 3 shows examples of gradients associated with the vertices of a cube. FIG. 4 represents interpolated subcubes and gradient normals which define the subcubes within the large cube. FIG. 5 shows subcubes having different interpolation factors along different axes.

Figure 6:
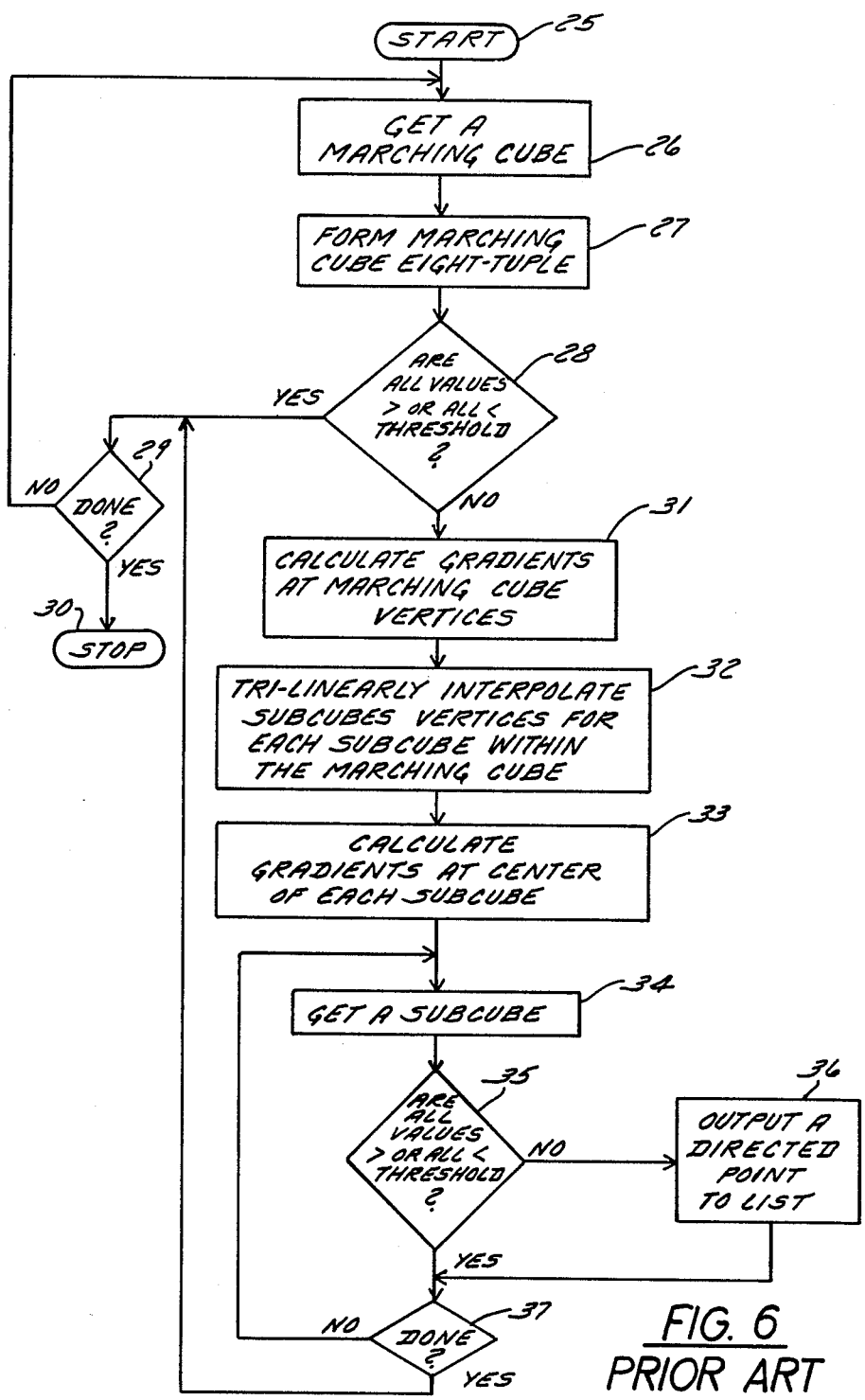
FIG. 6 is a flow chart according to a prior art implementation of the dividing cubes method.

The dividing cubes method itself will be described in more detail with reference to the flow chart in FIG. 6, which begins at start block 25. In steps 26 and 27, a large cube (i.e., marching cube) is obtained consisting of an eight-tuple of density functions $f(x,y,z)$, namely $[f(i,j,k), f(i+1,j,k), f(i,j+1,k), f(i+1,j+1,k), f(i,j,k+1), f(i+1,j,k+1), f(i,j+1,k+1), f(i+1,k+1)]$, where i is the row, j is the column, and k is the slice in the tomographic data. In a data base having N rows, N columns, and M slices (i.e., M is the number of $N \times N$ two-dimensional images), the marching cubes are obtained by looping through all combinations of $i=2, \ldots, N-1$; $j=2, \ldots, N-1$; and $k=2, \ldots, M$.

For each large cube, the eight vertices are compared to a threshold T in step 28. If all of the values for the vertices are greater than the threshold or if all are less than the threshold, then the surface does not pass through the large cube, and so the method checks to see if all large cubes have been processed in step 29. If finished, then the method halts at stop block 30 and other functions may then be performed (such as rendering and display of the defined surface). Otherwise, a return is made to step 26 to begin processing another large cube.

If step 28 determines tht there are vertices both above and below the threshold, then gradient values are calculated at each of the large cube vertices in step 31. Central differences can be used to calculate gradient estimates $g(i,j,k) = [g_x(i,j,k), g_y(i,j,k), g_z(i,j,k)]$ for each vertex (i,j,k) in a large cube as follows:

$$g_x(i,j,k) = [f(i + 1,j,k) - f(i - 1,j,k)]c_1$$

$$g_y(i,j,k) = [f(i,j + 1,k) - f(i,j - 1,k)]c_2$$

$$g_z(i,j,k) = [f(i,j,k + 1) - f(i,j,k - 1)]c_3$$

where $c_1$, $c_2$ and $c_3$ are constants depending on the pixel spacing and the slice spacing in the tomographic data. Thus, eight values each of $g_x$, $g_y$ and $g_z$ are found.

In step 32, density values are found for the subcube vertices by tri-linear interpolation. With positive integer interpolation factors A, B and C corresponding to i, j and k, subcube increments within a large cube are defined as $\Delta_i = 1/A$, $\Delta_j = 1/B$, and $\Delta_k = 1/C$, respectively. The vertices of each large cube v(i,j,k) are denoted as v(0,0,0), V(1,0,0), v(0,1,0), v(1,1,0), v(1,0,1), v(0,1,1), and v(1,1,1). Linear interpolation gives each subcube vertex density f'(I,J,K) defined as $f(i+I\Delta_i, j+J\Delta_j, k+K\Delta_k)$, where I=0,1,..., A, J=0,1,..., B, and K=0,1,..., C.

In step 33, gradient values are calculated for the center of each subcube using tri-linear interpolation of the gradients at the large cube vertices $g_x$, $g_y$ and $g_z$. The subcube gradients (each a vector G(I,J,K) with components $g_x$, $g_y$ and $g_z$) for each of the x, y and z components are $G_{x,y,z}(I,J,K) = g_{x,y,z}(i + [I + .5]\Delta_i, j + [J + .5]\Delta_j, k + [J + .5]\Delta_k)$, where I=0,1,..., A−1, J=0,1,..., B−1, and K=0,1,..., C−1.

Following the calculations of the subcubes and their gradients, the subcubes are fetched one at a time in step 34 by looping through all combinatons of I=0,..., I−1, J=0,..., B−1, and K=0,..., C−1. For each combination of I, J, and K, a subcube is defined by the eight-tuple [f'(I,J,K), f'(I+1,J,K), f'(I,J+1,K), f'(I+1,J+1,K), f'(I,J,K+1), f'(I+1,J,K+1), f'(I,J+1,K+1), f'(I+1,J+1,K+1)]. In step 35, the current subcube is tested against the threshold. If all subcube vertices are not either above or all below the threshold, then the location of the subcube and its normalized gradient are output to a list as a directed point in step 36, otherwise a check for completion is done in step 37. The gradient output to the list during step 36 is a normalized gradient defined as $G(I,J,K)/|G(I,J,K)|$.

When all subcubes have been processed, step 37 branches back to step 29 to process the next large cube.

The conventional dividing cubes method is efficiently designed for operation on a general-purpose computer. However, the method as formulated is not adaptable to vector processing since most of the processing relates to subcube calculations which are in an inner loop (i.e., steps 31–37) of the flow chart.

One implementaton of the invention is shown in FIG. 7. Two-dimensional tomograhic data is provided to a surface generator 40. Also input to surface generator 40 are the interpolation factors for forming subcubes, determined by other processing equipment or software, such as a general-purpose computer 39. Surface generator 40 implements the dividing cubes method using vector processing to generate a number of directed points defining the surface that are fed to a display processor 41 wich includes a Current-Transformation-Matrix (CTM) generator 42 and a renderer 43.

CTM generator 42 receives a viewer's commands via a command processor 45 for scaling, moving and rotating the object and forms the CTM which is provided to renderer 43 to operate on the directed points. Renderer 43 synthesizes the 3-D image (including projecting directed points onto 3-D pixels and determining shading of illuminated pixels) which is rasterized and sent to display 44 which could be a cathode-ray tube (CRT), for example.

An improved dividing cubes method adapted for array processing in surface generator 40 is shown by the block diagram of FIG. 8. To provide sufficient operands for vector processing, a row processing strategy is adopted. Thus, a column index is not specified while processing the data since all the columns in a row are processed together by means of vector functions. Depending on the size of array processor memory, more or less than one row can be processed at the same time.

In block 50, a row (or rows) of marching cubes and associated neighbor information is received and compared to a threshold which defines an object in the tomographic data. The cubes containing the object surface are marked and sent to block 51 for calculation of the gradients. Alternatively, block 50 can be skipped with all marching cubes being subdivided for processing even though the surface does not pass through them, provided that subdivision can be done fast enough. However, in a preferred embodiment, the large, marching cubes are tested and marked to form a compressed row vector. The use of compressed vectors reduces the amount of data requiring processing, but it also requires some additional bookkeeping to keep track of the spatial position of each marching cube.

The gradient calculations in block 51 use a central differences technique to generate three eight-tuples corresponding to the x, y and z components of the vertex gradients for each marked marching cube. These are concatenated in the compressed vector.

A call to a vector routine performs a single operation (perhaps complex) on all the elements in the vector. There is usually some overhead in invoking the routine. If, however, the number of elements in the vector is large, then the overhead can be neglected. The number of elements in a compressed vector can be relatively small. In this situation, the overhead associated with vector calls will degrade the run-time of dividing cubes. According to an embodiment of the invention, a number of compressed vectors are concatenated so that the resulting vector is sufficiently long. This is accomplished by means of a queue 52 which receives the marked cubes and gradients. The size of the queue is selected to provide a large concatenated vector near the capacity of the subdivision vector routine. When the queue is full or when the last row of data has been tested against the threshold, the marching cubes and gradients are de-queued and sent on for subdivision.

In the prior-art method, densities and gradients for all subcubes within a large cube were calculated at one time. In a typical situation, if all the values for an entire subdivided row were calculated at one time in the array processor method, up to 128K memory locations or more would be needed to store four values (one density and three gradient components) for each of up to 64 subcubes per marching cube in each row, with up to 512 cubes or more per row.

It is uneconomical to provide that much memory in an array processor because of the high-speed types of memory used in them. To avoid the need for this excessive amount of array processor memory, the present invention calculates densities and a gradient for one subcube from each marching cube at one time and tests these against the threshold or thresholds. After outputting the directed points from that subset of subcubes, a further subset of subcubes are calculated. By calculating just one subcube per marching cube at a time, only 2K memory locations are needed in the example with 4 values per subcube and 512 large cubes per row.

In order to calculate each selected subcube independently from all other subcubes in a large cube, the invention employs blocks 53–55 in FIG. 8. Thus, the consecutive tri-linear interpolation around a large cube in a selected order as used in the prior art is replaced with the evaluation of a single polynomial derived from the large cube values. Recalling the previously defined large cube vertices $v(0,0,0) \ldots v(1,1,1)$, interpolation factors A, B and C, and subcube indices I, J and K, where $I=0,\ldots,A; J=0,\ldots,B,$ and $K=0,\ldots,C$, each subcube vertex is defined as $v(\alpha, \beta, \gamma)$, where $\alpha=I/A$, $\beta=J/B$, and $\gamma=K/C$. To retain clarity of notation, no further subscript will be given with vertices v, it being understood that there is a vector of $v(0,0,0)$ values, a vector of $v(0,0,1)$ values, etc., all having a number of elements equal to the number of de-queued marching cubes. The invention uses the fact that the tri-linear interpolation of the eight large cube vertices to yield each subcube vertex $v(\alpha, \beta, \gamma)$ reduces to the polynomial:

$$v(\alpha, \beta, \gamma) = D_0 + D_1\alpha + D_2\beta + D_3\gamma + D_4\alpha\beta + D_5\alpha\gamma + D_6\beta\gamma + D_7\alpha\beta\gamma \quad (1)$$

where $D_0 = v(0,0,0)$ $D_1 = v(1,0,0) - v(0,0,0)$ $D_2 = v(0,1,0) - v(0,0,0)$ $D_3 = v(0,0,1) - v(0,0,0)$ $D_4 = v(1,1,0) - v(0,1,0) - v(1,0,0) + v(0,0,0)$ $D_5 = v(1,0,1) - v(0,0,1) - v(1,0,0) + v(0,0,0)$ $D_6 = v(0,1,1) - v(0,0,1) - v(0,1,0) + v(0,0,0)$ $D_7 = v(1,1,1) - v(0,1,1) - v(1,0,1) + v(0,0,1) - v(1,1,0) + v(0,1,0) + v(1,0,0) - v(0,0,0)$.

The $\alpha$'s, $\beta$'s and $\gamma$'s are the same for each large cube subdivision. Thus, arrays of the values of these three parameters in various combinations ($\alpha, \beta, \gamma, \alpha\beta, \alpha\gamma, \beta\gamma, \alpha\beta\gamma$) can be calculated in the setup stage for dividing cubes. Before the compressed vectors are subdivided, vectors of $[D_0, \ldots, D_7]$ for the density are generated. Three more sets of $[D_0, \ldots, D_7]$ are also generated for the components of the gradient from $G(I,J,K)$. Then four polynomials can be used to generate the values of the density at the vertices of each subcube and the values of the components of the gradient at the center of each subcube using the polynomial expansion for $G(I,J,K)$.

Returning to FIG. 8, block 53 calculates the polynomial coefficients. Block 54 provides one subcube from each marching cube at a time, for which densities and gradients are calculated in block 55. Each subcube is tested against the threshold in block 56 and those subcubes containing the surface are output as directed points to a list in block 57. Each directed point comprises a six-tuple formed by the concatenation of the subcube location (x,y,z) with the x, y and z components of the normalized gradient at the subcube center $(g_x, g_y, g_z)$.

Returning to the calculations of densities in block 55, each subcube requires the calculation of a density at eight subcube vertices. If the calculations are made by evaluating the polynomial eight times (i.e., once at the spatial location of each vertex), would require 64 multiply-adds.

In one embodiment of the invention, the number of calculations required in block 55 are reduced using a Taylor Series approximation of polynomial interpolation. Let the density function at each vertex be represented by $x(\alpha, \beta, \gamma)$. Assume that the center of the subcube is at (a,b,c). The eight vertices of the subcube are given by $(a \pm \delta_a, b \pm \delta_b, c \pm \delta_c)$, where $\delta_a = \Delta_i/2$, $\delta_b = \Delta_j/2$ and $\delta_c = \Delta_k/2$.

A first order Taylor series expansion of Equation (1) is given by:

$$X(\alpha+\delta_\alpha, \beta+\delta_\beta, \gamma+\delta_\gamma) = X(\alpha, \beta, \gamma) + P_\alpha \delta_a + P_\beta \delta_b + P_\gamma \delta_c$$

where $P_\alpha$, $P_\beta$ and $P_\gamma$ are partial derivatives given by $$P_\alpha = D_1 + D_4\beta + D_5\gamma + D_7\beta\gamma$$

$$P_\beta = D_2 + D_4\alpha + D_6\gamma + D_7\alpha\gamma$$

$$P_\gamma = D_3 + D_5\alpha + D_6\gamma + D_7\alpha\beta$$

Now the polynomial can be evaluated once to find x(a,b,c). Then, the values of the density can be found as follows:

$$x(a \pm \delta_a, b \pm \delta_b, c \pm \delta_c) = x(a,b,c) \pm P_\alpha \delta_a + P_\beta \delta_b \pm P_\gamma \delta_c$$

This method requires only 17 multiply-adds and 27 additions.

Figure 9:
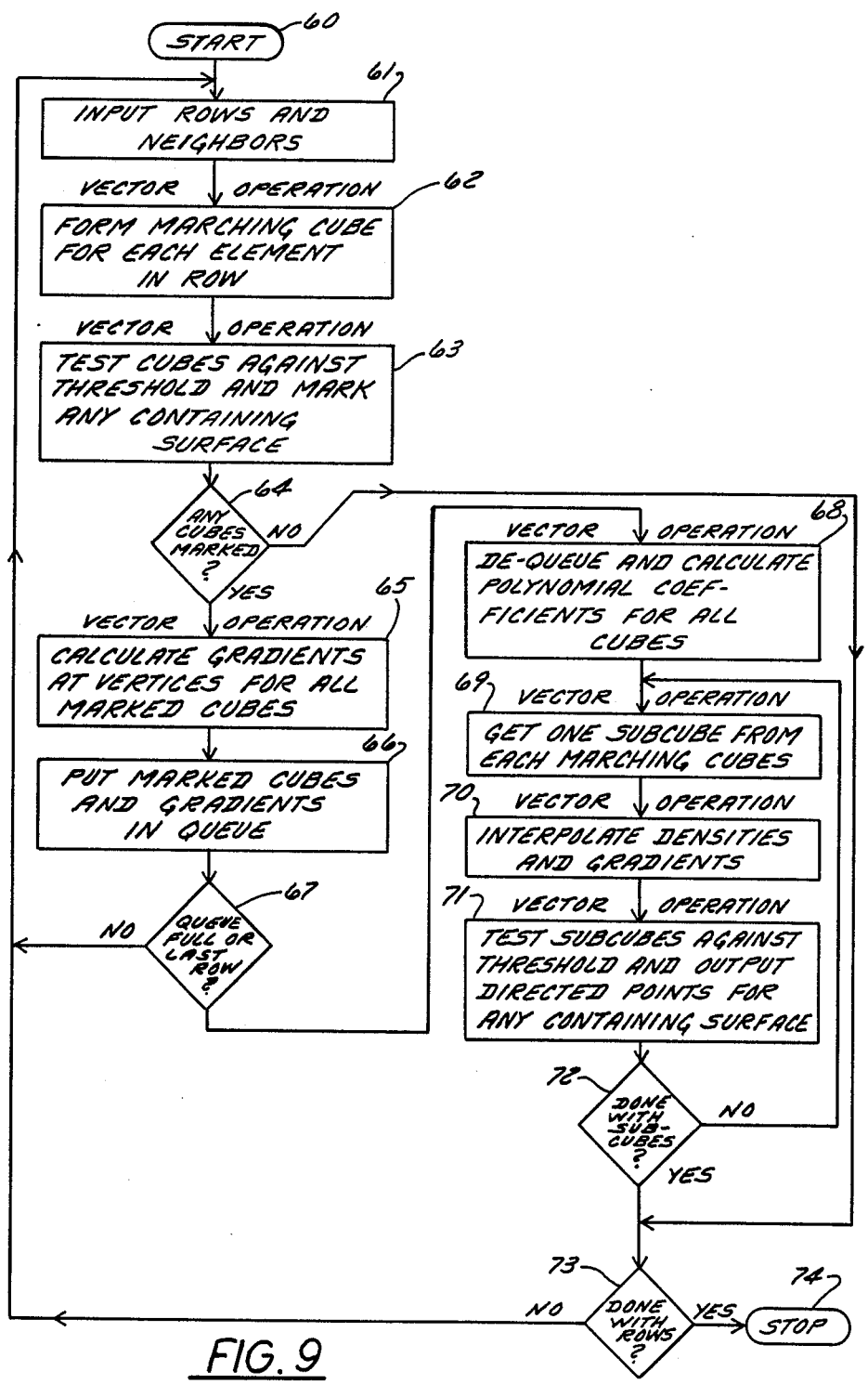
FIG. 9 is a flow chart of a method vector operations.

As a further illustration of the vector processing method of the invention, a flow chart of a best mode of the invention is shown in FIG. 9. The method initiates at start block 60. In steps 61 and 62, a row or rows of tomographic data and associated neighbor information are input and marching cube eight-tuples are formed. In step 63, the density at each cube's vertices is tested against the operator specified threshold, and all cubes containing the surface are marked. In step 64, if no cubes were marked (i.e., the surface does not pass through the current row), then the method jumps to step 73 to test whether there are more rows to process. If there are marked cubes, gradients at the vertices of all marked cubes are calculated in step 65.

The marked cubes and their associated gradients ar put into a queue in step 66. Step 67 tests for a full queue or the processing of the last row in the tomographic data. If the queue is not full and there are more rows, then the method returns to step 61. Otherwise, polynomial coefficients are calculated in step 68.

In step 69, respective subcubes are taken from each marching cube. Densities and gradients are calculated in step 70. Each of the subcubes are compared to the threshold in step 71 and all subcubes that contain the surface are output to a list with their gradients. If there are more subcubes to be processed from the currently de-queued marching cubes, then step 72 executes a return to step 69. Otherwise, a check is made in step 73 for any remaining unprocessed rows. Once all rows are processed, the method halts in stop block 74.

Most of the steps in FIG. 9 are executable as vector operations. Thus, the method can be used to advantage in an array processor such that 3-D graphical data is rapidly processed.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. Apparatus for generating a three-dimensional surface definition from three-dimensional tomographic data, comprising:

first comparison means for comparing the vertex values of a plurality of cube elements along one dimensional axis of said tomographic data with a predetermined threshold, and for marking each cube element having at least one vertex value greater than and at least one vertex value less than said threshold;

queue means coupled to said first comparison means for accumulating a specified minimum number of marked cube elements;

subdivision means coupled to receive said accumulated marked cube elements from said queue means for forming subcube vertex values within each of said marked cube elements at a level of processing efficiency determined by said specified minimum number; and second comparison means coupled to said subdivision means for comparing said subcube vertex values with said threshold, and for outputting to a list each subcube having at least one subcube vertex value greater than and at least one subcube vertex value less than said threshold.

2. The apparatus of claim 1 wherein said subdivision means performs a polynomial interpolation of said tomographic data, said subdivision means comprising polynomial coefficient means coupled to said queue means for calculating a plurality of polynomial coefficients from said data corresponding to the vertices of said cube elements.

3. The apparatus of claim 2 wherein said subdivision means further comprises calculating means coupled to said polynomial coefficient means for evaluating said polynomial interpolation at the center of each subcue and for using a series expansion of said polynomial to determine said subcube vertex values.

4. The apparatus of claim 1 further comprising:

first gradient means coupled to said first comparison means and to said queue means for calculating gradients at the vertices of said marked cube elements and providing said gradients to said queue means; and second gradient means coupled to said queue means for calculating gradients corresponding to subcubes defined by said subcube vertex values.

5. A method for generating a three-dimensional surface definition from three-dimensional tomographic data, comprising the steps of:

processing a plurality of marching cubes within said data to select the marching cubes of said plurality through which said surface passes;

moving a minimum number of said selected marching cubes into a queue;

de-queuing said minimum number of marching cubes from said queue;

subdividing said de-queued marching cubes to form subcubes;

processing said subcubes to determine whether said surface passes through each respective subcube, the union of all said subcubes containing said surface providing said surface definition;

performing said de-queuing, subdividing and subcube processing steps as vector operations having efficiency levels respectively determined by said minimum number; and selecting said minimum number to provide specified efficiency levels for said vector operations.

6. The method of claim 5 wherein said subdividing step includes the step of calculating the gradient of said tomographic data at the center of each of said subcubes.

7. The method of claim 5 wherein said subdividing and subcube processing steps are repeatedly performed, each repetition using one respective subcube from each of said de-queued marching cubes, until all subcubes within said de-queued marching cubes have been processed.

8. The method of claim 5 wherein said subdividing step uses a polynomial interpolation of said tomographic data.

9. The method of claim 8 wherein said subdividing step comprises the steps of:

calculating a plurality of polynomial coefficients for each of said de-queued marching cubes;

evaluating said polynomial interpolation at the center of each subcube; and solving a series expansion to derive values for the vertices of each subcube.

10. The method of claim 5 wherein:

said moving step comprises moving said minimum number of marching cubes into said queue to form a vector of concatenated data elements.

* * * * *

UNITED STATES PATENT AND TRADEMARK OFFICE
CERTIFICATE OF CORRECTION

PATENT NO. : 4,868,748
DATED : Sep. 19, 1989
INVENTOR(S) : Carl R. Crawford et al.

It is certified that error appears in the above-identified patent and that said Letters Patent is hereby corrected as shown below:

Col. 2, line 47, change "efine" to --define--.

Col. 3, line 7, change "involking" to --invoking--.

Col. 4, line 53, change "f(i+1, k+1)}" to --f(i+1, j+1, k+1)}--.

Col. 5, line 24, insert after "v(1,1,0)", --v(0,0,1)--.

Col. 5, line 40, delete "1-1" and substitute therefor --A-1--.

Col. 9, line 59, change "subcue" to --subcube--.

Signed and Sealed this

Eighteenth Day of June, 1991

*Attest:*

HARRY F. MANBECK, JR.

*Attesting Officer*  *Commissioner of Patents and Trademarks*